United States Patent [19]

Masaki et al.

[11] 4,087,838
[45] May 2, 1978

[54] APPARATUS FOR OBTAINING A LIGHT CARRYING INFORMATION THEREWITH

[75] Inventors: Katsumi Masaki, Kodaira; Takeshi Goshima, Tokyo, both of Japan

[73] Assignee: Canon Kabushiki Kaisha, Tokyo, Japan

[21] Appl. No.: 707,058

[22] Filed: Jul. 20, 1976

[30] Foreign Application Priority Data

| Jul. 25, 1975 | Japan | 50-90919 |
| Jul. 25, 1975 | Japan | 50-90920 |
| Aug. 7, 1975 | Japan | 50-96207 |
| Sep. 10, 1975 | Japan | 50-109810 |

[51] Int. Cl.² .............................................. H04N 1/28
[52] U.S. Cl. ................................... 358/199; 358/285; 358/286
[58] Field of Search ...................... 358/199, 285, 286; 250/199

[56] References Cited

U.S. PATENT DOCUMENTS

| 3,770,882 | 11/1973 | Stymber | 358/214 |
| 3,836,709 | 9/1974 | Hutchison | 358/302 |

*Primary Examiner*—Benedict V. Safourek
*Assistant Examiner*—Edward L. Coles
*Attorney, Agent, or Firm*—Fitzpatrick, Cella, Harper & Scinto

[57] ABSTRACT

An apparatus for obtaining an information-carrying light comprises a modulated beam generator emitting a beam having an intensity variable in accordance with a modulating signal applied thereto, a data sheet or original bearing thereon the data to be illuminated by the beam from the modulated beam generator, a photoelectric converter means for receiving a secondary light resulting from the data on the data sheet being illuminated by the beam emitted from the modulated beam generator, and a modulating signal generator for generating the modulating signal applied to the modulated beam generator in order that the quantity of light received by the photoelectric converter means may be substantially constant.

28 Claims, 18 Drawing Figures

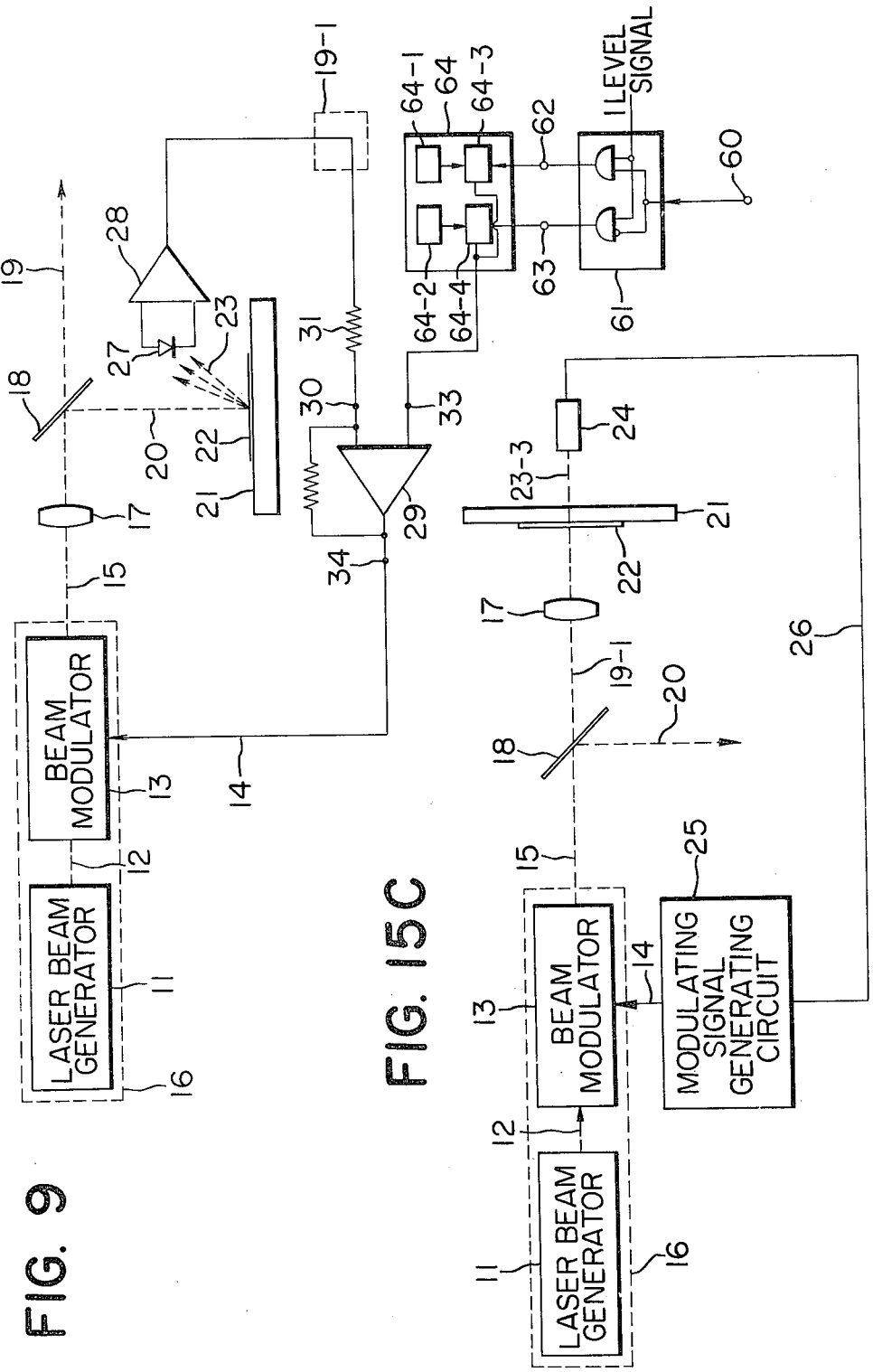

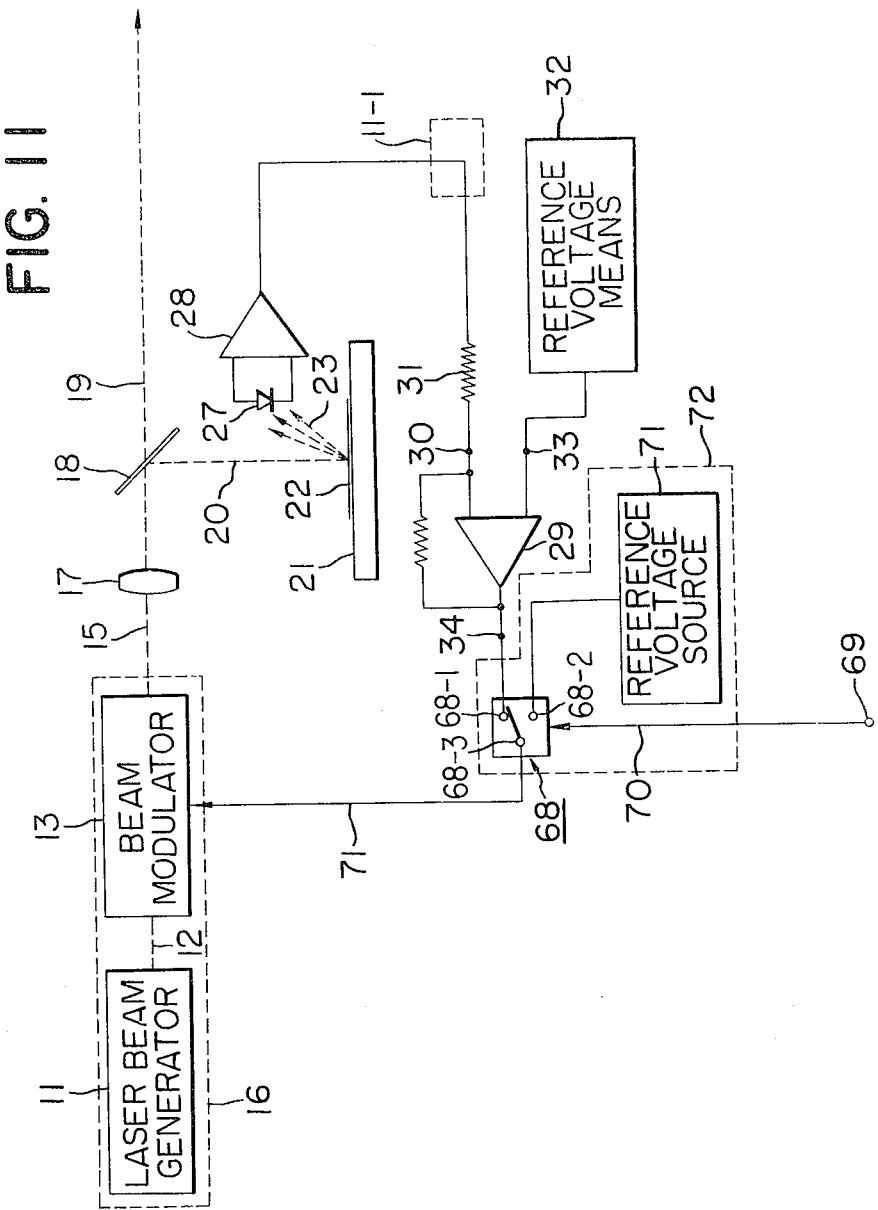

4,087,838

APPARATUS FOR OBTAINING A LIGHT CARRYING INFORMATION THEREWITH

BACKGROUND OF THE INVENTION

1. Field of the Invention

This invention relates to an apparatus for obtaining an information carrying light by converting image information on a data sheet into light information, and more particularly to such an apparatus which is suited for use as a recording apparatus or the like.

DESCRIPTION OF THE PRIOR ART

Apparatus in which a predetermined intensity of light is projected upon a data sheet bearing an image thereon and the light reflected by or transmitted through the data sheet is converted into an electrical signal are well known.

In such as apparatus, however, said light is only intended to obtain said electrical signal and this has made it necessary that a separate recording apparatus be provided when it is desired to effect recording by the use of such electrical signal. Such a recording apparatus is designed so that the light from a light generator for emitting a predetermined intensity of light is introduced into a light modulator and said electrical signal is also applied to such light modulator, whereby there is obtained a light having an intensity variable in accordance with the electrical signal applied from said light modulator and such light is projected upon a recording medium to effect recording on the recording medium in accordance with the electrical signal.

Therefore, in such an apparatus wherein a predetermined intensity of light is projected upon a data sheet and the secondary light from the data sheet is converted into an electrical signal, it has been necessary to provide a separate recording apparatus when the recording is to be effected by the use of said electrical signal, and even if an element such as a semiconductor laser beam generator capable of effecting light generation and light modulation at the same time was present in the apparatus, the characteristic of such element could not fully be utilized.

SUMMARY OF THE INVENTION

The present invention controls the intensity of illuminating light so that a secondary light such as the light reflected by or transmitted through a data sheet upon application of the illuminating light to the data sheet may have a substantially constant intensity, whereby the illuminating light applied to the data sheet may be of an intensity corresponding to the information on the data sheet, thus eliminating the above-noted disadvantages.

It is therefore an object of the present invention to present an improved apparatus for obtaining an information-carrying light.

It is another object of the present invention to present such an apparatus which is simple and inexpensive to construct.

It is still another object of the present invention to present such as apparatus which is suitable for use with a light generator so that modulating signals are applied to the light generator itself to vary the intensity of the light from the light generator.

It is yet still another object of the present invention to present such an apparatus which is suitable for application to a recording apparatus or the like.

It is a further object of the present invention to present such an apparatus in which the information-carrying light is modulated by the information on the data sheet and extraneous information signals.

Other objects and effects of the present invention will become fully apparent from the following detailed description taken in conjunction with the accompanying drawings.

BRIEF DESCRIPTION OF THE DRAWINGS

FIG. 9 is a block diagram of an apparatus for modulating the beam both by the information on the original and the information in the form of extraneously applied electrical signals.

FIG. 11 is a block diagram showing another embodiment of the apparatus for modulating the beam both by the information on the original and the information in the form of extraneously applied electrical signals.

DESCRIPTION OF THE PREFERRED EMBODIMENTS

Figure 1:
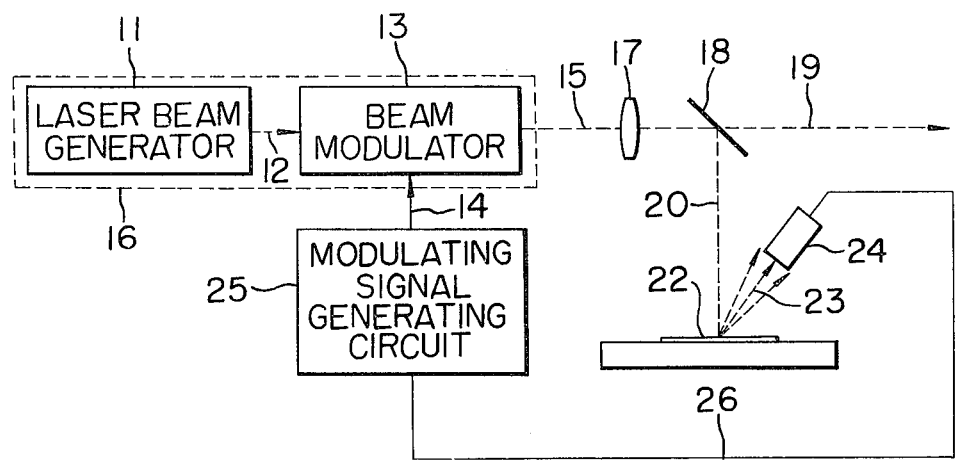
FIG. 1 is a block diagram schematically showing the construction of the present invention.

Referring to FIG. 1, a laser beam generator 11 which is a light generating means emits a predetermined intensity of beam 12 which is applied to a conventional beam modulator 13. The beam modulator comprises a polarizer plate, a crystal and an analyser, all not shown. The crystal is a double-refractive crystal having electro-optical effects such as Pockel's effect, Kerr effect, etc. and can cause a phase difference to be produced between orthogonal polarized component waves of the incident beam by a voltage applied thereto.

The polarizer plate and the analyser are in orthogonal relationship with each other, and the voltage V applied to the crystal and the transmission factor T of the modulator are in the relationship given by the following equation:

$$T = \sin^2(\alpha \frac{L}{D} \pi V) \tag{1}$$

where α is a constant inherent to the crystal, L the length of the crystal in the direction of the beam, and D the length of the crystal in the direction of the electric field (perpendicular to the beam direction). That is, when the voltage is zero, the transmission factor is zero and as the voltage is increased, the transmission factor is also increased. The maximum transmission factor is obtained when the voltage is at a level of Vλ2 for which the phase difference /2 the crystal is λ/2, where λ is the wavelength. Therefore, the beam 12 applied to the beam modulator 13 is transmitted through the beam modulator 13 in accordance with the voltage (modulating signal) applied to the crystal from a line 14, and taken out as a beam 15. Of course, this beam 15 has had its intensity varied in accordance with the modulating signal applied to the beam modulator 13.

In other words, the laser beam generator 11 and the beam modulator 13 together constitute a modulated beam generator 16 which emits a modulator beam. Such beam 15 is directed through a lens 17 to a beam splitter 18, which splits the modulated beam into two beams 19 and 20, of which the beam 20 is projected upon an original 22 resting on an original carriage 21. The original 22 may be, for example, a sheet of white paper printed with characters in black ink, namely, bearing visible image information thereon, and the light 23 reflected from the original 22 (secondary light) is decreased in quantity when the beam 20 impinges on the printed characters on the original and increased in quantity when said beam inpinges the white ground of the paper. The lens 17 serves to focus the beam 20 on the original, but it need not be inserted if the cross-section of the beam 15 is of a sufficiently small area.

Thus, when the secondary light 23 is received by a photoelectric converter element 24, this converter element may produce an electrical signal corresponding to the secondary light and such electrical signal may be applied to a modulating signal generating circuit 25 through a line 26. The modulating signal generating circuit 25 generates a modulating signal to be applied to the beam modulator 13, and the modulating signal is a signal which controls the modulator such that the output signal produced by the photoelectric converter element 24 assumes a substantially constant level with respect to a predetermined reference level. Thus, the beam modulator 13 is controlled such that it emits a greater quantity of beam when the image on the original (data sheet) irradiated with the beam 20 is black which is less reflective of light and that it emits a smaller quantity of beam when the image on the original irradiated with the beam 20 is white which is more reflective of light. Therefore, the beam emitted from the beam modulator 13 has some image information. Accordingly, the beam 19 obtained by the beam splitter 18 also has image information and such beam may be used for various purposes.

However, in order that the information on the original 22 may be so applied to the beam 19, the original 22 must be luster-scanned by the beam 20. For this purpose, the beam 20 may be repeatedly deflected in one direction while the original carriage 21 may be moved in a direction prependicular to said direction of deflection, or alternatively the luster-scanning may be effected only be the beam 20 with the original carriage 21 fixed immovably.

The photoelectric converter element 24 and the modulating signal generating circuit 25 will further be described by reference to FIG. 2. The photoelectric converter element comprises a photodiode 27, which receives and converts the light into an electrical signal, which is in turn amplified by an amplifier 28. The amplified signal is applied to one input terminal 30 of an operational amplifier 29 through a resistor 31. Designated by 32 is a reference voltage means from which a predetermined voltage to provide a reference may be put out. The reference voltage from such reference voltage means is applied to the other input terminal 33 of the operational amplifier 29.

Thus, the output terminal 34 of the operational amplifier 29 produces a high level signal when the level of the signal to the input terminal 30 becomes low, and a low level signal when the level of the signal to the input terminal 30 becomes high.

Accordingly, by construction the beam modulator 13 such that the beam 12 more readily passes through the beam modulator 13 when the voltage level of the modulating signal is high and that the beam 12 is less ready to pass through the beam modulator 13 when said voltage level is low, control may be effected so that the beam 15 may be weakened for a greater quantity of reflected light and intensified for a smaller quantity of reflected light, whereby the output signal from the amplifier 28 may have a substantially constant difference from the output voltage provided by the reference voltage means. (However, it is to be understood that the output signal from the amplifier 28 is at high level for the greater quantity of reflected light and at low level for the smaller quantity of reflected light.) Accordingly, the output signal from the amplifier 28 may always be maintained at a substantially constant level even if the original 22 is luster-scanned by the beam 20, and thus the beam 12 is intensity-modulated by the beam modulator 13 in accordance with the image on the original.

Figure 2:
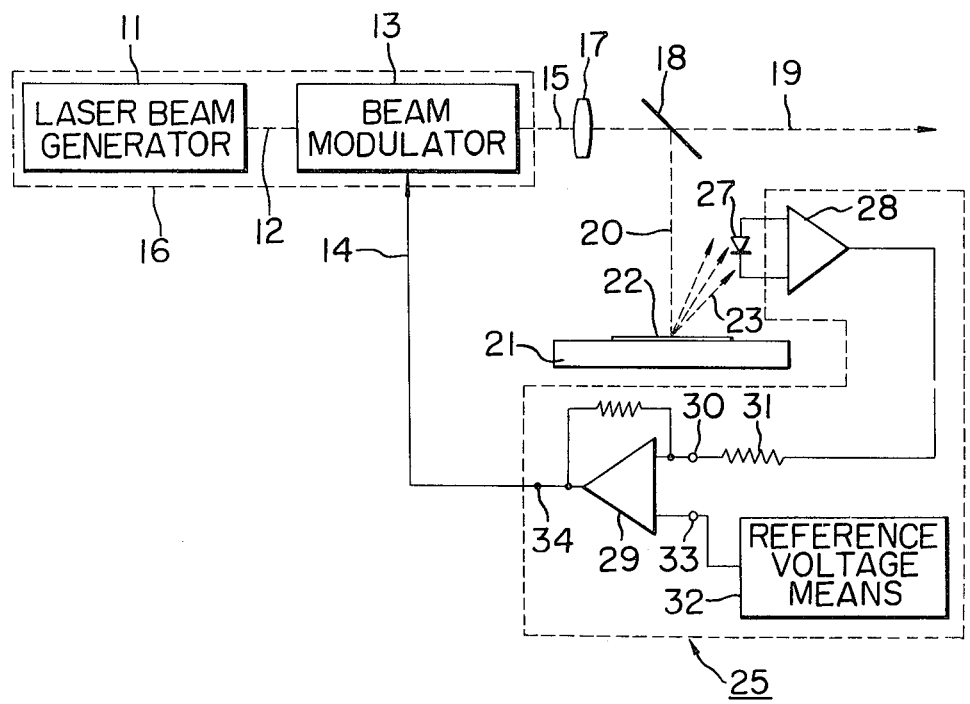
FIG. 2 is a more detailed block diagram of the apparatus shown in FIG. 1.

In FIG. 2, reference numerals similar to those in FIG. 1 are similar in significance to those described in connection with FIG. 1. Also, in FIGS. 1 and 2, the reflected light has been used as the secondary light, whereas the transmitted light may of course be used as the secondary light.

Figure 3:
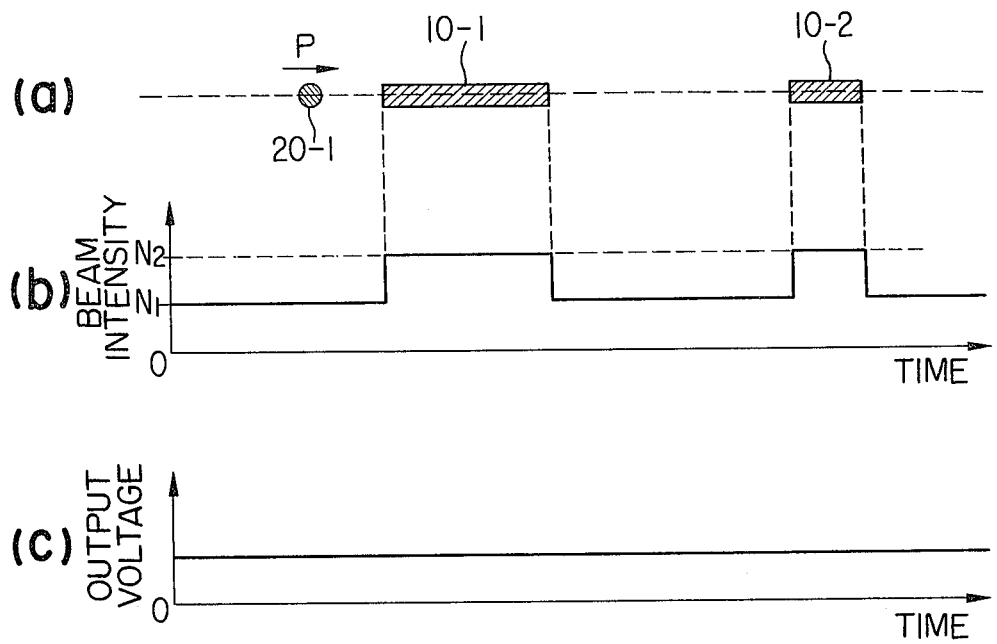
FIG. 3 is a graph illustrating the beam intensity obtained when the information on an original is scanned by a beam and the voltage obtained by a photodetector.

FIG. 3 illustrates the signal waveforms in various portions of the data sheet as shown in FIG. 3a when such data sheet is scanned by the beam 20 in FIG. 1 or 2 which is deflected (by unshown deflector means). If the data sheet (original) having black portions 10-1 and 10-2 on a white background is scanned by a beam spot 20-1 along a dotted line in the direction of arrow P as indicated in FIG. 3a, a stronger beam is emitted from the beam modulator when the beam spot 20-1 is scanning the black portions and a weaker beam is emitted from the beam modulator when the beam spot 20-1 is scanning the white portions, as will be seen in FIG. 3b, because the beam modulator is controlled such that the output of the photoelectric converter element is substantially constant, as already described in connection with FIGS. 1 and 2. In this manner, the output of the photoelectric converter element 24 becomes substantially constant as shown in FIG. 3c.

Since the beam from the beam modulator contains therein the information on the original image as already noted, a copying apparatus may be formed by arranging it that a recording medium is irradiated with the beam 19.

Figure 4:
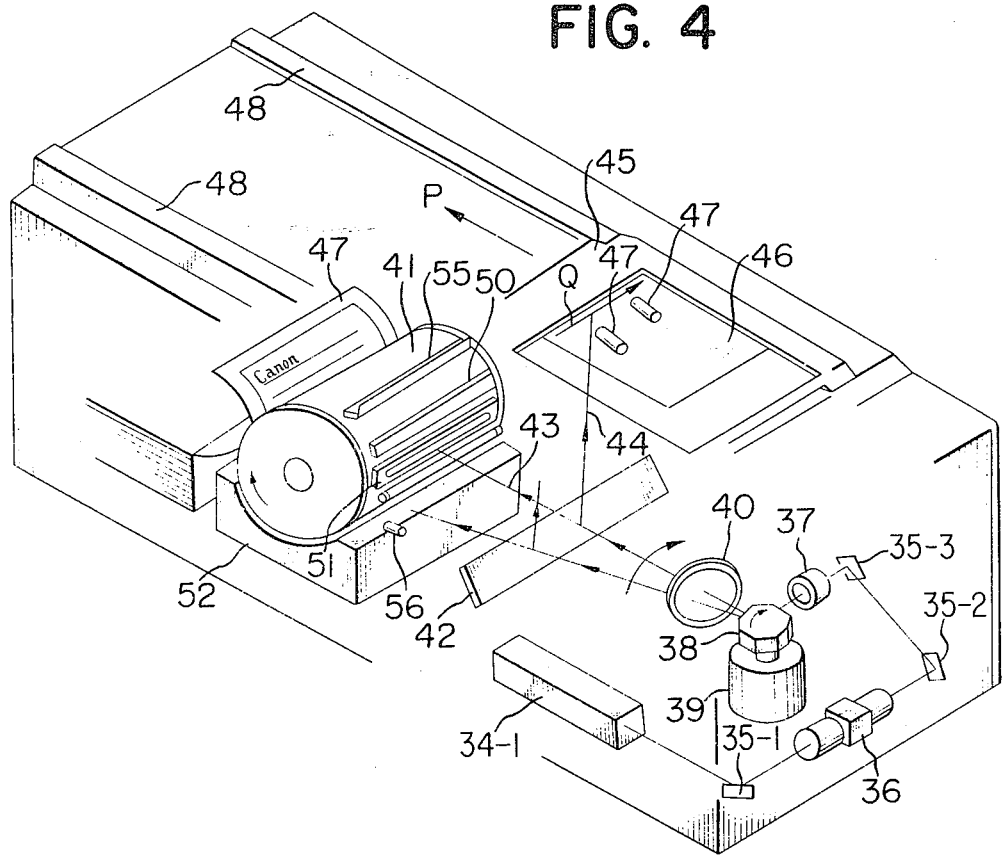

FIG. 4 further illustrates the copying apparatus so formed. The laser beam oscillated from a laser beam oscillator 34-1 is directed via a mirror 35-1 to the input opening of a modulator 36. The mirror 35-1 is inserted to bend the light path to thereby minimize the space for the apparatus and if unnecessary, such mirror may be eliminated.

The modulator 36 may be either a conventional acousto-optical modulator element utilizing the acousto-optical effect or a conventional electro-optical element utilizing the electro-optical effect.

In the modulator 36, the laser beam is modulated for intensification or weakening in accordance with the input signal to the modulator 36. The laser beam from the modulator 36 is directed via mirrors 35-2 and 35-3 to a beam expander 37, by which the diameter of the beam is expanded while the beam remains a parallel beam. The laser beam having its diameter so expanded is projected onto a polygonal rotatable mirror 38 having a plurality of mirror surfaces. The polygonal rotatable mirror 38 is mounted on a shaft supported by a bearing of high precision (for example, a pneumatic bearing), and driven by a constant speed motor 39 (such as a hysteresis synchronous motor or a DC servomotor), so that the beam from the beam expander is horizontally swept by the polygonal mirror 38, and then passed through an image-forming lens (or condenser lens) 40 to be focused as a spot on a photosensitive drum 41. When a parallel beam is focused as a spot through an image-forming lens the minimum diameter dmin of the spot is given as:

$$dmin = f \frac{\lambda}{a} \quad (2)$$

where $f$ is the focal length of the image forming lens, $\lambda$ the wavelength of the light used and A the incidence aperture of the image forming lens, and if $f$ and $\lambda$ are constant, the spot diameter dmin is smaller as A is greater. The aforementioned beam expander 37 is employed to provide such an effect. Therefore, where the necessary dmin is provided by the diameter of the beam from the laser beam oscillator, the beam expander 37 may be eliminated.

Disposed between the photosensitive drum 41 and the image forming lens 40 is a beam splitter 42 having such a length as to cover the entire sweeping width of the beam. Thus, part 43 of the beam from the polygonal rotatable mirror 38 falls on the photosensitive drum 41 while the other part 44 of said beam falls on the transparent glass plate 46 of the original carriage 45 on which the data sheet (original) may rest. Accordingly, the beam 44 is moved on the glass plate 46, as indicated by arrow Q, by the rotation of the polygonal rotatable mirror 39.

Designated by 47 is a light-sensing element for receiving the reflected light derived from the beam 44 projected on an original when placed on the glass plate 46 for converting such reflected light into an electrical signal. The original carriage 45 is movable on rails 48 at a constant speed in the direction of arrow P by a drive means, not shown, and therefore, by placing an original on the glass plate 46 and rotating the rotatable polygonal mirror 39 while moving the original carriage 45 in the direction of arrow P, the original can be scanned throughout its entire surface.

When this occurs, the photosensitive drum 41 having a photosensitive layer provided over the entire surface thereof is of course rotated in synchronism with the movement of the original carriage.

Since the light-sensing element 47 and the modulator 36 respective correspond to the photoelectric converter element 24 and the beam modulator 13 shown in FIGS. 1 and 2, the modulator 36 is controlled by the output of the light-sensing element 47 through the circuit as shown in FIGS. 1 and 2, whereby the same information as the data on the original carriage 45 may be recorded on the photosensitive drum 41.

Thereafter, the photosensitive drum 41 is treated by the electrophotographic treatment process to render the recorded information into a visible image, which is then transferred and fixed on plain paper 47, which is in turn put out as a hard copy.

According to the present invention, as will be apparent from what has been described in connection with FIGS. 1 and 2, the apparatus must be designed such that the beam 20 is always projected on the original, and thus the beam is also always projected on the photosensitive drum 41. For example, if the transmission factor to the beam of the beam splitter in FIG. 4 is 50% and if the beam intensity from the modulator 36 is varying as shown in FIG. 3b, a beam of intensity ranging from $$\frac{N1}{2} \text{ to } \frac{N2}{2}$$

will always be projected on the photosensitive drum 41.

However, when the beam intensity is less than $$\frac{N1}{2},$$

the photosensitive drum must not be sensitized and it is therefor necessary for the photosensitive drum to have such a threshold level that it is not sensitized when the beam intensity corresponds to the white level.

Figure 5:
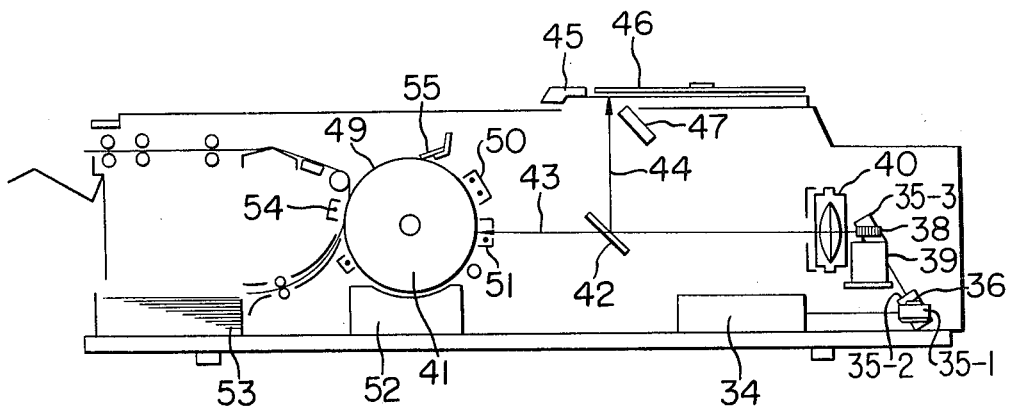
FIGS. 4 and 5 are a perspective view and a side view, respectively, of a recording apparatus constructed according to the present invention.

The printing section will now be described by reference to FIG. 5. An example of the electrophotographic process to which the present embodiment is applicable is disclosed in our U.S. Pat. No. 3,666,363, wherein the insulating layer surface of a photosensitive medium 49 basically comprising an electrically conductive back-up member, a photoconductive layer and an insulating layer is uniformly precharged to the positive or the negative polarity by a first corona charger 50 to cause charges opposite in polarity to said pre-charge to be captured in the interface between the photoconductive layer and the insulating layer or in the photoconductive layer, whereafter the charged insulating layer surface is illuminated by the laser beam 43 while being subjected to AC corona discharge by an AC corona discharger 51 so that a pattern resulting from the surface potential difference created in accordance with the light-and-dark pattern of the laser beam 43 is formed on said insulating layer surface, which is then uniformly subjected to exposure over the entire area thereof to form an electrostatic latent image with high contrast on the insulating layer surface, and the electrostatic latent image is further developed into a visible image by a developing device 52 with the aid of a developer composed chiefly of charged toner particles, whereafter the visible image is transferred onto a transfer medium 53 such as paper or the like by the utilization of an internal or an external electric field, and the transfer image is fixed by fixing means 54 using an infrared ray lamp or hot plate, thereby providing an electrostatically printed image, while on the other hand, after the image transfer, the insulating layer surface is cleaned by a cleaning device 55 to remove any residual charged particles so as to render the photosensitive medium 49 ready for reuse.

Reference will now be had to FIG. 6 to describe a phenomenon which will take place in the photosensitive medium in the embodiment so far described when the charge in the uniformly pre-charged insulating layer surface of the photosensitive medium is attenuated by the AC corona discharge while, at the same time, such insulating layer surface is illuminated by the laser beam.

FIG. 6 illustrates the manner in which the surface potential of the insulating layer surface of the photosensitive medium varies.

Figure 6A:
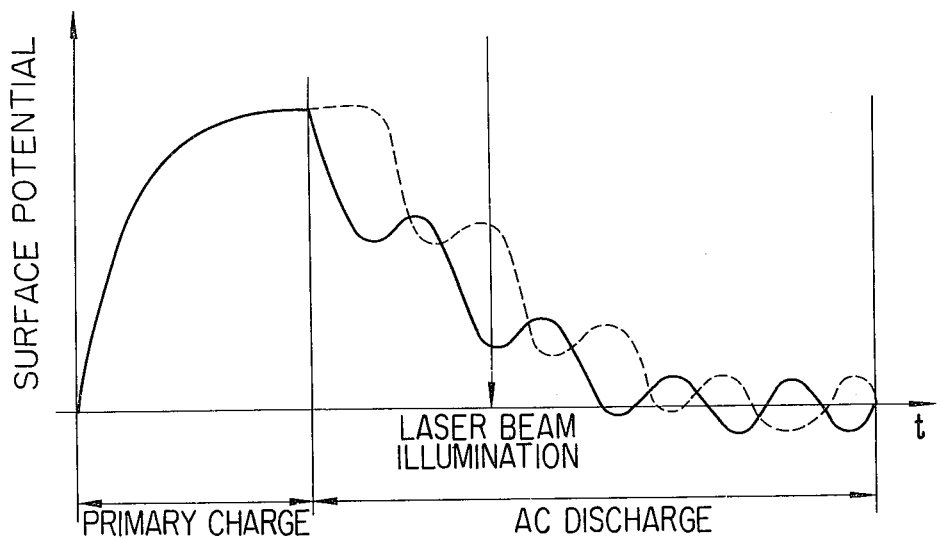
FIGS. 6A and 6B are waveform graphs for illustrating the AC discharging.
Figure 6B:
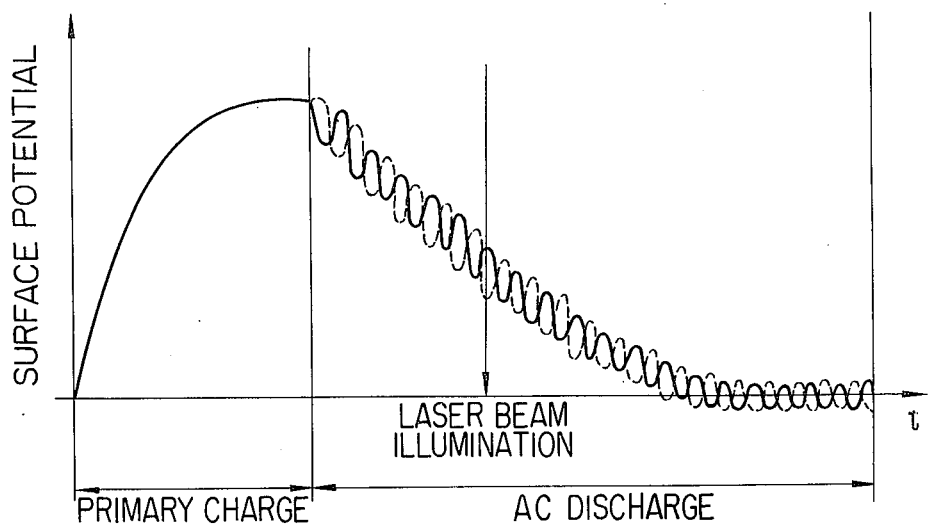

In FIG. 6A, there is shown the case where the frequency of the AC corona discharge current is relatively low. In such case, the potential during the AC discharging of the insulating layer surface may assume median values between the solid-line curve and the dotted-line curve due to the phase difference of the AC voltage. However, in a particular portion of the photosensitive medium, the illumination by the laser beam occurs for a very short time, for example, 150 nanoseconds in the present embodiment. Therefore, due to the potential difference in insulating layer surface when illuminated by the laser beam, the potential of the electrostatic image formed after the allover exposure is not constant in spite of the constant quantity of the illuminating laser beam. This results in the developed visible image having an irregularity synchronous with the frequency of the alternating current. Such phenomenon does not appear in the applications to copying machines or the like because the exposure takes place throughout the whole of the AC discharging area thereby avoiding any adverse effects due to the phase difference.

If the frequency of the AC discharge is increased (FIG. 6B) to eliminate the phenomenon of such irregularity, the entire discharging time is not varied but the amplitude of the fluctuation of the insulating layer surface potential synchronous with the AC frequency is decreased. This reduces the potential difference in the insulating layer surface when illuminated by the laser beam, thus rendering the irregularity of the visualized image practically negligible.

Figure 7:
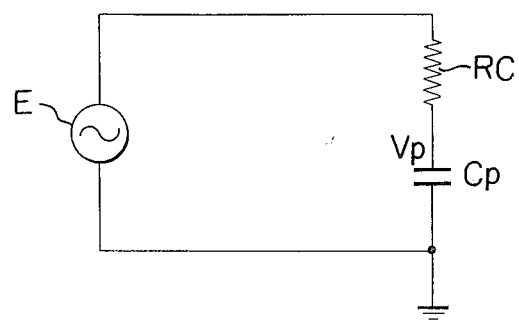
FIGS. 7 and 8 are an equivalent circuit diagram and an enlarged view, respectively, for illustrating the AC discharging effected on a photosensitive medium.

This may be accounted for by the equivalent circuit as shown in FIG. 7. In FIG. 7, E designates the voltage applied to the discharging electrode of the AC corona discharger, Rc the resistance encountered by the corona current flowing between the discharging electrode and the photosensitive medium, and Cp the electrostatic capacity of the photosensitive medium when such medium is regarded as the load only to the capacity.

Now let $V_0$ be the insulating layer surface potential resulting from the primary charging just before the AC discharging is initiated, and suppose $E = E_0 \cos(wt + \theta)$ for the voltage applied to the AC corona discharging electrode. Then, the insulating layer surface potential $V_p$ during the AC discharging is expressed as:

$$V_p = \frac{E_O}{\sqrt{(WCpRc)^2 + 1}} \left\{ \sin(wt + \theta + \phi) - \sin(\theta + \phi) \cdot l - \frac{t}{CpRc} \right\} + V_0 l - \frac{t}{CpRc} \tag{4}$$

$$\phi = \tan^{-1}\left(\frac{1}{wCpRc}\right)$$

The discharging time is given by the second term in the righthand side of equation (4), and the time constant $\tau$ thereof is CpRc.

Also, the amplitude of the fluctuation resulting from the frequency of the AC corona discharge is given as $$\frac{E_O}{\sqrt{(wCpRc)^2 + 1}}$$

by the first term.

Figure 8:
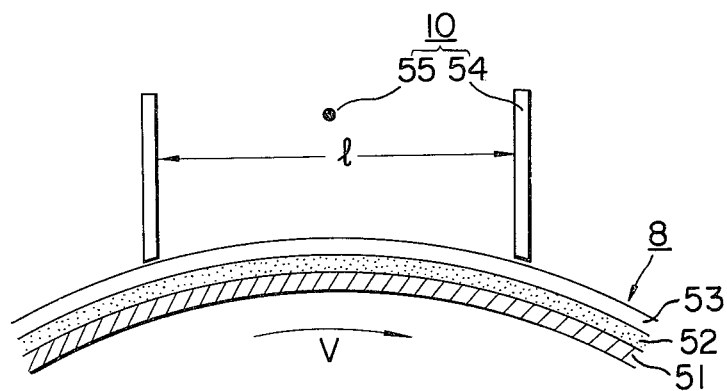

From FIG. 8, the AC discharging time $td$ is given as:

$$td = \frac{l}{v} \tag{5}$$

where $v$ is the peripheral velocity of the drum and $l$ is given by the width of the discharging area.

Further, the quantity corresponding to the $Cp$ in the equivalent circuit of FIG. 7 is proportional to the surface area of the photosensitive medium which passes through the discharging area for a unit time.

$$Cp = Av \tag{6}$$

where A is a proportion constant.

Assume that the discharging is sufficiently occurring under the conditions of $Cp=Cp_1$, $Rc=Rc_1$ and $v=v_1$. Then, the time constant of the discharging in equation (4) is:

$$\tau_1 = Cp_1 Rc_1 \tag{7}$$

At this time, the amplitude $W_0$ of the fluctuation resulting from the AC discharge frequency $W_0$ is:

$$W_O = \frac{E_O}{\sqrt{(w_O Cp_1 Rc_1)^2 + 1}} \tag{8}$$

Assume that this amplitude $W_0$ is of such a magnitude as will cause the above-mentioned density irregularity of the visualized image. By making $w=w_1$ ($w_1 > w_0$), $$W_1 \frac{E_O}{\sqrt{(w_1 Cp_1 Rc_1)^2 + 1}} < \tag{9}$$

$$\frac{E_O}{\sqrt{(w_O Cp_1 Rc_1)^2 + 1}} = W_O$$

Thus, $W_1$ is sufficiently small to prevent occurrence of said density irregularity.

In this manner, by varying the frequency of the AC corona discharge, said density irregularity may be eliminated without varying the discharging time.

Next, suppose a case where the peripheral velocity of the drum is $v = \alpha v_1 = v_2$. Then, $$Cp_2 = \alpha Cp_1 \tag{10}$$

and the discharging time is:

$$td_2 = \frac{l}{v_2} = \frac{l}{\alpha v_1} = \frac{td_1}{\alpha} \quad (11)$$

$$td_1 = \frac{l}{v_1}$$

Hence, the discharging time constant must be $\tau_2 = \tau 1/\alpha$. Therefore, in order that the discharging may be sufficiently effected within $td_2$, the discharging time constant must be:

$$\tau_2 = Cp_2 \cdot Rc_2 = \frac{\tau_1}{\alpha} = \frac{Cp_1 \cdot Rc_1}{\alpha} \quad (12)$$

By the use of equation (10), it will be seen that the discharging time constant must be:

$$Rc_2 = \frac{Rc_1}{\alpha_2} \quad (13)$$

In practice, the variation in Rc may be accomplished by changing the distance between the discharge electrode wire and the photosensitive medium. The amplitude $W_2$ then resulting from the fluctuation of the AC corona discharge frequency is:

$$W_2 = \frac{E_O}{\sqrt{(w_2 Cp_2 Rc_2)^2 + 1}} \quad (14)$$

Thus, the condition imposed on $w_2$ for $w_2 = w_1$ may be obtained:

$$w_2 Cp_2 Rc_2 = w_1 Cp_1 Rc_1$$
$$w_2 = w_1 \cdot \frac{Cp_1 \cdot Rc_1}{Cp_2 \cdot Rc_2} = \alpha w_1 \quad (15)$$

Equation (15) shows that an AC corona frequency higher than a certain value must be applied in order that the aforementioned irregularity may not occur to the visualized image, and that value is proportional to the peripheral velocity of the drum. The present embodiment has been carried out with the peripheral velocity $v$ of the drum at 30 cm/sec., the width of the discharging area being 3 cm × 30 cm, the electrostatic capacity C of the photosensitive medium being 5 PF/cm², the AC discharge current of 75 µA rms, the voltage of 7 KV, the frequency $f$ of 1 KHz and the electrostatic contrast of about 500 V. The development has been effected by the use of liquid developer and reversal development. In these, experiments, the irregularity of the visualized image could be eliminated under the condition that the alternating discharge frequency $f$ is:

$$f \geq \frac{v}{0.03} Hz \quad (16),$$

where $f = 2\pi\omega$ and v is in cm/sec. This means that the pitch on the photosensitive drum resulting from the AC corona discharge is 0.3 mm. Therefore, the effect of equation (16) may more generally be expressed by the following condition:

$$f \geq \frac{v}{P} \quad (17),$$

where P is a constant determined by the electrostatic capacity of the photosensitive medium, the width of the discharging area, the condition of the development, etc., and has been 0.03 in the foregoing embodiment.

Another example of the electrophotography to which the present invention is applicable is the electrostatic image forming process as disclosed in our Japanese Patent Publication No. 19748/1967. This process uses a photosensitive medium basically comprising an electrically conductive back-up member, a photoconductive layer and an insulating layer and comprises the steps of uniformly charging the surface of the insulating layer to the positive or the negative polarity by a first corona discharge to cause charges opposite in polarity to said first charge to be captured in the interface between the photoconductive layer and the insulating layer or in the photoconductive layer, further applying AC corona discharge to the charged surface to attenuate the charge in the insulating layer surface, subsequently applying the aforementioned laser beam as information signal to the insulating layer surface to form thereon an electrostatic image in accordance with the light and dark of the laser beam, and thereafter carrying out the developing and subsequent steps similar to those described with respect to the first embodiment.

In the first and second embodiments, the photosensitive medium and the laser beam oscillator used have been as follows:

Condition A:
a. Laser beam oscillator
   He-Ne gas laser of wavelength 632.8 mµ
b. Photosensitive medium
   A photosensitive substance obtained by adding 10 grams of vinyl chloride to 90 grams of cadmium sulfide activated by copper and by further adding a small quantity of thinner to the mixture and mixing them together was applied onto an aluminum foil of about 100 µ to a thickness of about 70µ by the use of the spray method. Subsequently, film of Miler having a thickness of about 25 µ was intimately layered onto the photoconductive film surface by means of an adhesive to provide a photosensitive plate. Such photosensitive plate was wrapped about a drum formed of aluminum to obtain a photosensitive drum. In the case of this photosensitive medium, the polarity of the first charge is the positive.

Condition B:
a. Laser beam oscillator
   He-Cd laser of wavelength 441.6 mµ
b. Photosensitive medium
   A layer of Te with a thickness of about 1µ was vacuum-evaporated onto an aluminum substrate, and a layer of Se with 15% Te content was further vacuum-evaporated to a thickness of about 90 µ, whereafter transparent insulative resin was applied on the surface of said layer to a thickness of about 30 µ, and then the materials were set to obtain a photosensitive medium. In the case of this photosensitive medium, the polarity of the first charge is the negative.

Further, various laser beam sources which have been existing as well as those which will be announced in the future may also be applied to the first and the second latent image formation process. It is essential to use, in combination, a photosensitive medium having a spectral sensitivity characteristic matching the wavelength of a respective laser.

The lasers usable with the present invention include Ar gas laser, Kr gas laser, Ar+Kr gas laser, (visible) semiconductor laser, pigment laser, and infrared laser beam converted into a laser of double wavelength by non-linear crystal (YAG laser, semiconductor laser).

As will be appreciated from what has been described hitherto, a copying apparatus may be constructed according to the present invention and, simply by providing such copying apparatus (recording apparatus) with some additional circuitry, there may be provided a recording apparatus which will enable electrical signals put out as from a computer and the information on the original to be recorded in superposed relationship on the photosensitive drum.

Such a recording apparatus is shown in FIG. 9, wherein reference numerals similar to those in FIGS. 1 and 2 are similar in significance to those in FIGS. 1 and 2.

The apparatus shown in FIG. 9 differs from that shown in FIGS. 1 and 2 in that the reference potential applied to the input terminal 33 of the operational amplifier 29 is varied by said electrical signals. More specifically, terminal 60 is one which receives binary-coded digital signals which may be the output from an unshown electronic computer or magnetic tape, and the digital signals applied through such terminal may be discriminated by "0", "1" discriminator 61 as to whether they are 0-level signals or 1-level signals, and when the applied signals are 0-level signals, terminal 63 may produce output signals and when the applied signals are 1-level signals, terminal 62 may produce output signals. Such output signals may be applied to a reference voltage means 64 which includes therein a constant voltage source 64-1 for generating a voltage a(V), and a constant voltage source 64-2 for generating a voltage b(V), and these voltages may be applied to an input terminal 33 through switches 64-3 and 64-4, respectively. Therefore, when the output signals from the discriminator 61 are being applied to the terminal 62, the switch 64-4 is closed while the switch 64-3 is opened so that the voltage a(V) is applied to the input terminal 33, but when the output signals from the discriminator 61 are being applied to the terminal 63, the switch 64-4 is opened while the switch 64-3 is closed so that the voltage b(V) is applied to the input terminal 33.

When the voltage b(V) is equal to the reference voltage put out by the constant voltage means 26 and the voltage a(V) is higher than said voltage b(V), and if, in FIG. 2, the voltage a(V) is applied from the constant voltage means 26, then the beam 15 is set to such a value of beam intensity as will substantially record the black irrespective of whether the data 18 is black or white. Thus, if the binary-coded signals from an electronic computer are being successively applied to the terminal 60, the reference signal is changed to a (V) and b(V) in accordance with the data signals so that the beam 15 is modulated both by the digital signals applied from the terminal 60 and the image information on the original 22.

When the reference voltage b resulting from the "0" level of the data signal is being applied to the input terminal 60, the beam 15 is modulated in accordance with the information on the original in the same manner as described in connection with FIG. 2, and when the reference voltage a resulting from the "1" level of the data signal is being applied to the terminal 60, the beam 15 is modulated to the beam intensity equal to that for recording the black on the recording medium, irrespective of the signal applied to the input terminal 30, as already noted.

In other words, when the information on the data sheet is black or the data signals are "1, ", the beam 15 is modulated to the beam intensity for recording the black on the recording medium and when the information on the data sheet is white or the data signals are "0", the beam 15 is modulated to the beam intensity for recording the white on the recording medium.

In the above-described embodiment, for simplicity of description, the data signals have been described as digital signals having binary numbers "0" and "1", whereas analog signals having continuously changing levels may be used if use is made of a reference voltage means whose reference potential to be applied to the terminal 33 is variable in accordance with the analog signals, whereby the beam 15 may be analogously modulated in the manner already described. Also, the information on the data sheet has been described as a white or black visible record, but this may of course be information having a median degree of brightness between white and black and in such a case, the intensity of the beam 15 will be modulated in accordance with that degree of brightness.

Figure 10:
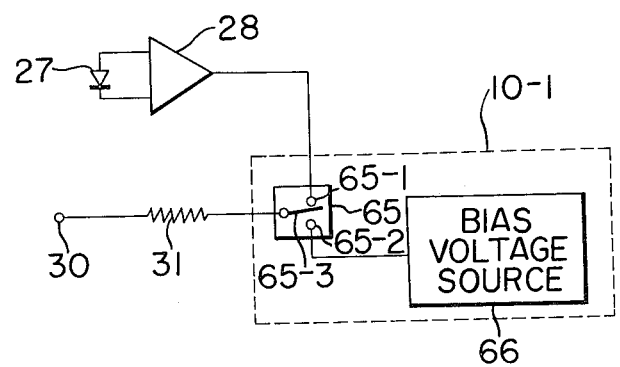
FIG. 10 is a block diagram of a change-over device for modulating the beam only by said information in the form of extraneously applied electrical signals in FIG. 9.

Further, as shown in FIG. 10, a switch 65 may be inserted between the amplifier 28 and the input terminal in FIG. 9 to apply the output of the amplifier 28 to the contact 65-1 of the switch 65 and apply the output of a bias voltage source 66 to the contact 65-2 of the switch 65 while the contact 65-3 of the switch 65 may be connected to the input terminal 30, so that the voltage put out by the bias voltage source 66 may be made substantially equal to the voltage put out by the amplifier 28 when the photodiode in FIG. 2 is receiving the reflected light from the white portion of the original, whereby the switch 65 may be operated to select either the recording solely by the signals applied to the terminal 60 or the superposed recording wherein the information from the terminal 60 and the information from the original are recorded in superposed relationship. Thus, if the contacts 65-3 and 65-1 of the switch 65 are connected to each other, there is provided the same circuit arrangement as that of FIG. 9 and as already described, the beam 15 is modulated both by the image information on the original 22 and the electrical signal from the terminal 60, and if the contacts 65-3 and 65-2 of the switch 65 are connected to each other, the beam 15 is modulated solely by the electrical signal from the terminal 60.

The portion of FIG. 10 which is encircled by a dotted line 10-1 is a circuit which replaces the portion of FIG. 9 encircled by a dotted line 19-1. Also, in FIG. 11, the portion encircled by a dotted line 11-1 may replace the portion of FIG. 10 encircled by the dotted line 10-1, to obtain the same effect as that described in connection with FIG. 10.

FIG. 11 shows another embodiment for achieving the same effect as that described by the embodiment of FIG. 9. This embodiment differs from the FIG. 2 embodiment in that terminal 34 is connected to a switching circuit 68, which is controlled by a binary-coded digital signal applied from terminal 69 so that when a particular digital signal (for example, "1" in the "0 ", "1" signal) is applied from terminal 69, contacts 68-3 and 68-2 are connected to each other to cause a predetermined voltage from a reference voltage source 71 to be applied to the contact 68-3 and that when another particular digital signal (for example, "0" in the "0 ", "1" signal) is applied from terminal 69, contacts 68-3 and 68-1 are connected to each other as shown in FIG. 11.

The voltage applied from such reference voltage source 71 to the terminal 68-2 is equal in level to the voltage put out at terminal 34 when the beam 20 is illuminating the black characters on the original 22 in FIG. 2.

Therefore, in FIG. 11, when the signal of logic "0" is being applied from the terminal 69, the contacts 68-3 and 68-1 are connected to each other to effect entirely the same operation as that described in connection with FIG. 2, that is, the beam 15, 20 is modulated by the information on the original 22, but when the signal of logic "1" is being applied from the terminal 69, the beam 20, namely, the beam 15 is controlled, entirely independently of the information on the original 22, so that the beam 15 has the same beam intensity as that of the beam 20 which is illuminating the black characters on the original 22. In other words, in the embodiment of FIG. 11, irrespective of the information on the original 22, the voltage from the reference voltage source 71 is applied to the beam modulator 16 prior to the information on the original 22, upon arrival of the "1" level signal at the terminal 69. In FIG. 11, reference numerals similar to those in FIG. 2 are similar in significance to those of FIG. 2.

Figure 12:
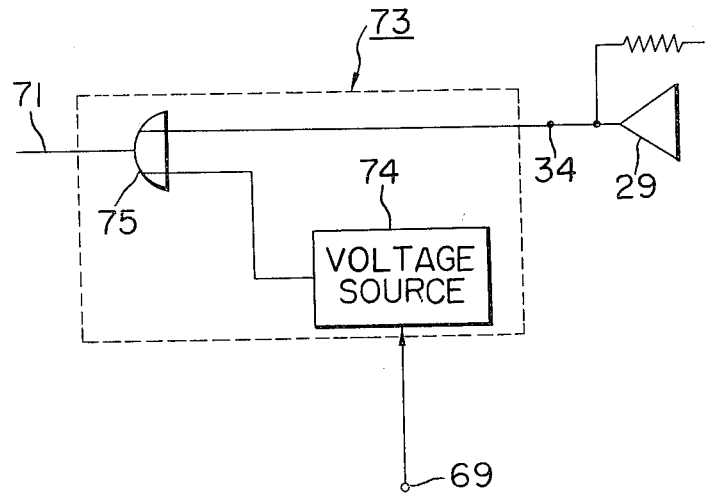
FIG. 12 is a block diagram showing another form of the mixer shown in FIG. 11.

Further, the mixer encircled by a dotted line 72 in FIG. 11 may also be designed as the mixer 73 encircled by a dotted line 73 in FIG. 12. Such mixer 73 is constructed so that when the signal applied from the terminals 69 is a particular signal (for example, the signal of logic "1"), the output of a voltage source 74 adapted to produce at its output terminal the same voltage as that of the reference voltage source 71 in FIG. 11 (the voltage source 74 produces no output voltage when another particular signal such as signal of logic "0" is being applied to the terminal 69) is applied to an OR gate 75 while, at the same time, the signal from the terminal 34 in FIG. 11 is applied to the OR gate 75.

Figure 13:
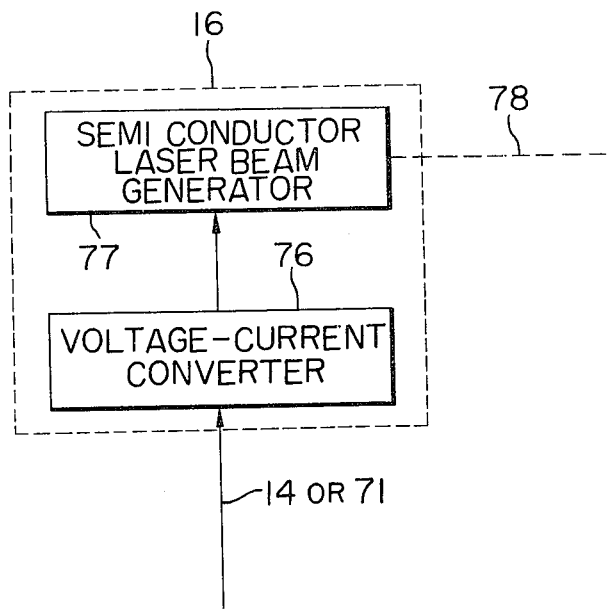
FIG. 13 shows, the block diagram, the modulated light generator according to another embodiment.

In FIGS. 1, 2, 9, 10, 11 and 12, the modulated beam generator 16 has been described as comprising a laser beam generator 11 and the beam modulator 13, but alternatively such modulated beam generator 16 may be provided by a laser beam generator having the modulating function, for example, a semiconductor laser beam generator (such as C30130 commercially available from RCA of the United States). Such a semiconductor laser beam generator has its modulating function controlled by an electric current and therefore, if a semiconductor laser beam generator 77 is used for the modulated beam generator 16 as shown in FIG. 13, it is necessary in FIGS. 1, 2 9, 10, 11 and 12 that the modulating voltage signal to be applied from the line 14 or 71 to the modulated beam generator 16 be converted into a current by a voltage-current converter 76 and then applied to the semiconductor laser beam generator 77. A beam 78 so provided by the semiconductor laser beam generator 77 has been modulated in the same manner as the beam 15 in FIGS. 1, 2, 9, 10, 11 and 12.

Figure 14:
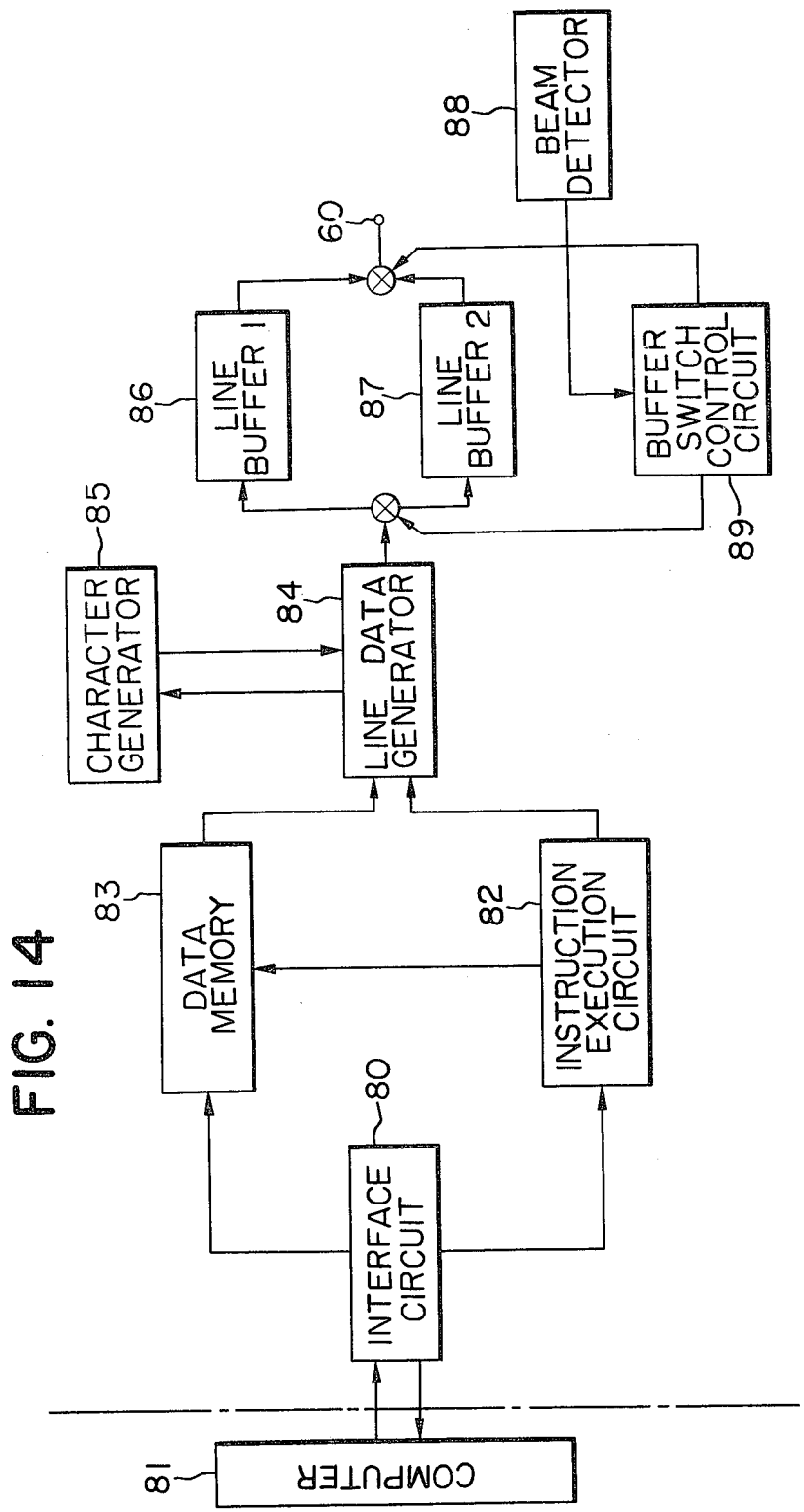
FIG. 14 is a block diagram of a device for generating the extraneously applied electrical signal.

Signals from a computer or the like are applied to the terminal 60, 69 in FIGS. 9, 10, 11 and 12, and a data signal generator will now be described briefly with reference to FIG. 14. The information to be applied from an electronic computer to the terminal 60 or 69 is passed in a predetermined format directly or through a memory medium such as magnetic tape or magnetic disc to the interface circuit 80 of the present apparatus. Various instructions from the computer 81 are decoded and executed by an instruction execution circuit 82. The data are stored in a data memory 83 each in a predetermined amount. The data are given, in the case of character information, in the form of binary codes and in the case of figure information, in the form of picture elements or line data (so-called vector data) forming the figure. These modes are designated prior to the data, and the instruction execution circuit 82 controls the data memory 83 and line data generator 84 so as to process the data in accordance with the designated mode. The line data generator 84 generates the last data corresponding to one scan line.

More specifically, when the data is given in the form of character code, character patterns are read out of the character generator 85 and the character patterns for one line are arrayed and buffered or the character codes for one line are buffered and character patterns are successively read out of the character generator 85, whereby the data for modulating the laser beam corresponding to one scan line are prepared in succession. Even when the data are figure information, the data are transformed into scan line data so that the data for modulating the laser beam corresponding to one scan line are produced in succession. The data corresponding to one scan line are alternately applied to line baffers 86 and 87 under the control of a buffer switch control circuit, these line buffers each comprising a shaft register or the like having the same number of bits as the number of picture elements for one scan line.

The data in the line buffer 86 or 87 are read successively bit by bit for one scan line with the beam detection signal from the beam detector 88 used as the trigger signal. The data for one scan line stored in the line buffer is delivered therefrom while one reflecting surface is scanning the photosensitive drum along a line perpendicular to the axis of rotation of the drum. Data signals are alternately read out of the line buffers 86 and 87 under the control of the buffer switch control circuit 89. That is, when a data signal is being read out of one of the line buffers, a data signal is written in the other line buffer. By such a system, every data can be applied to the modulator when the polygonal rotatable mirror sweeps over the photosensitive drum at a very short interval from one reflecting surface to a subsequent one thereof. Before one scan line is canned, the photosensitive drum continues its constant speed rotation to move over an amount corresponding to a suitable scan line interval.

Figure 15A:
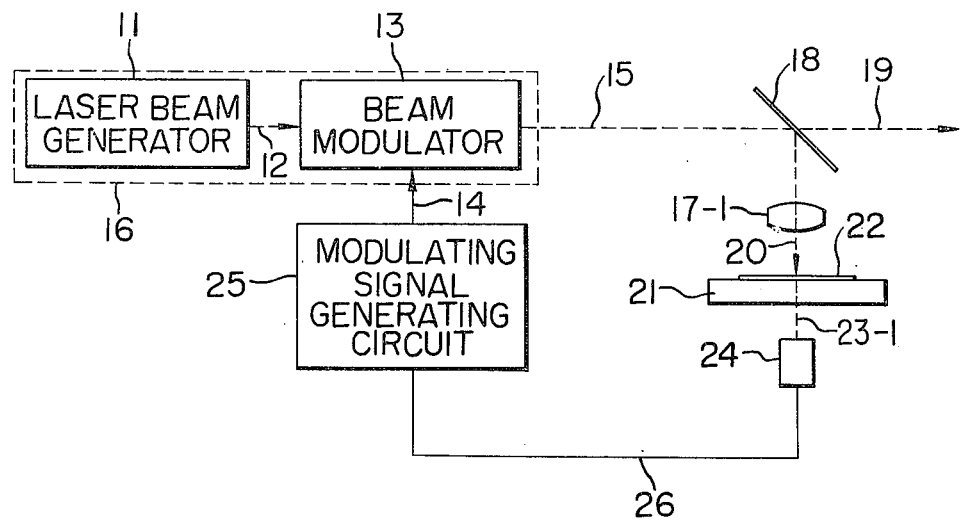
FIG. 15 is a block diagram for schematically showing the construction according to another embodiment of the present invention.
Figure 15B:
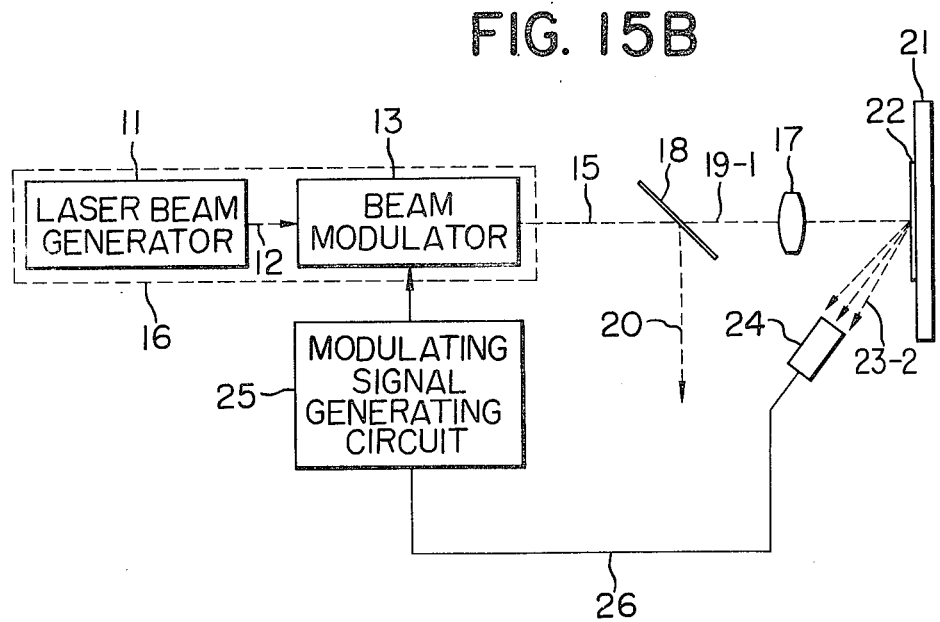

The foregoing embodiments have been described as being based on the apparatus shown in FIG. 1, whereas the present invention is not restricted to the construction shown in FIG. 1 but may also be constructed as shown in FIGS. 15A-C. More specifically, as shown in FIG. 15A, the beam 23-1 transmitted through the original 22 (secondary beam) may be detected by the photoelectric converter element 24 and the condenser lens 17-1 may be disposed between the beam splitter 18 and the original 22 or such condenser may be even eliminated. Alternatively, as shown in FIG. 15B or 15C, the beam 19-1 passed through the beam splitter 18 may be thrown upon the original 22 and in this case again, the reflected beam 23-2 from the original 22 (secondary beam) may be detected by the photoelectric converter element 24 as shown in FIG. 15B, or the beam 23-3 transmitted through the original 22 (secondary beam) may be detected by the photoelectric converter element 24.

Again in these embodiments of FIGS. 15B and 15C, the condenser lens 17 may be disposed between the beam modulator 13 and the beam splitter 18 or between the beam splitter 18 and the original 22 or may be eliminated.

It will further be appreciated that the techniques as shown in FIGS. 2, 4, 5, 9, 10, 11, 12, 13 and 14 are intactly applicable to the apparatus as shown in FIG. 15 in accordance with the concept of the present invention.

What is claimed is:

1. An apparatus for obtaining an information-carrying light comprising:
    modulated light generated means emitting light having an intensity variable in accordance with a modulating signal applied thereto;
    deflector means for deflecting the light emitted from said modulated light generating means;
    light splitter means for splitting the light from said modulated light generating means into a plurality of light beams;
    photoelectric converter means for detecting secondary light from material being illuminated by one of the plurality of light beams and for producing an electrical signal corresponding to the quantity of secondary light detected;
    modulating signal generating means for generating the modulating signal applied to said modulated light generating means in order that the quantity of light detected by said photoelectric converter means is substantially constant; and
    mixer means for mixing an extraneously applied electrical signal and the output of said modulating signal generating means and for applying the mixed signals to said modulated light generating means.

2. An apparatus according to claim 1, wherein said mixer means includes interruption means for interrupting the application of the output of said modulating signal generating means to said modulated light generating means when the extraneously applied electrical signal is at a particular value.

3. An apparatus according to claim 1, further comprising a signal source for applying a particular level of signal to said modulated light generating means when said interruption means is interrupting the application of the output of said modulating signal generating means to said modulated light generating means.

4. An apparatus according to claim 1, wherein said modulated light generating means comprises laser beam generating means for generating a predetermined intensity of laser beam and light modulating means for modulating said laser beam in accordance with the modulating signal applied thereto.

5. An apparatus according to claim 1, wherein said modulated light generating means comprises a semiconductor laser beam generating means for emitting a laser beam having an intensity corresponding to the modulating signal applied thereto.

6. An apparatus for obtaining information-carrying light comprising:
    modulated light generating means for emitting light having an intensity varying in accordance with a modulating signal applied thereto;
    material holder means for supporting material to be illuminated by the light emitted from said modulated light generating means;
    photoelectric converter means for detecting secondary light from the material on said material holder means when the material is illuminated by the light emitted from said modulated light generating means and for producing an electrical signal corresponding to the quantity of secondary light detected;
    reference signal generating means for generating a reference signal with which the electrical signal produced by said photoelectric converter means is compared; and
    comparator means for comparing said electrical signal with said reference signal to detect a difference therebetween and for applying a signal corresponding to said difference to said modulated light generating means as said modulating signal to maintain the quantity of light detected by said photoelectric converter means substantially constant.

7. An apparatus according to claim 6, wherein said comparator means comprises voltage comparing means for comparing the voltage of the electrical signal produced by said photoelectic converter means with the voltage of the reference signal produced by said reference signal generating means to detect a difference therebetween and for producing a signal corresponding to said difference as said modulating signal.

8. An apparatus according to claim 6, wherein said modulated light generating means comprises a semiconductor laser beam generating means.

9. An apparatus according to claim 6, wherein said secondary light comprises the light reflected from said material.

10. An apparatus according to claim 6, wherein said secondary light comprises the light transmitted through said material.

11. An apparatus according to claim 6, further comprising light splitter means for splitting the light from said modulated light generating means into a plurality of light beams and for directing one of said plurality of light beams onto the material supported by said material holder means.

12. An apparatus according to claim 11, further comprising a light-responsive, cylindrical recording drum for illumination by another of said plurality of light beams from said light splitter means.

13. An apparatus according to claim 12, further comprising deflector means for deflecting the modulated light to the beam splitter means.

14. An apparatus for obtaining information-carrying light comprising:
    modulated light generating means for emitting light having an intensity varying in accordance with a modulating signal applied thereto;
    light splitter means for splitting the light emitted from said modulated light generating means into a plurality of light beams;
    material holder means for supporting material to be illuminated by one of the split light beams;
    photoelectric converter means for detecting secondary light from the material on said material holder means when the material is illuminated by said one light beam and for producing an electrical signal corresponding to the quantity of secondary light detected;
    reference signal generating means for generating a reference signal with which the electrical signal produced by said photoelectric converter means is compared;
    comparator means for comparing said electrical signal with said reference signal to detect a difference therebetween and for applying a signal corresponding to said difference to said modulated light generating means as said modulating signal to maintain the quantity of light detected by said photoelectric converter means substantially constant; and a light-responsive recording medium for illumination by another of said plurality of light beams provided by said light splitter means.

15. An apparatus according to claim 14, wherein said comparator means comprises voltage comparing means for comparing the voltage of the electrical signal produced by said photoelectric converter means with the voltage of the reference signal produced by said reference signal generating means to detect a difference therebetween and for producing a signal corresponding to said difference as said modulating signal.

16. An apparatus according to claim 14, further comprising light deflector means for deflecting the light produced from said modulated light generating means to said light splitter means.

17. An apparatus according to claim 14, further comprising level varying means for varying the level of the reference signal produced by said reference signal generating means, by an extraneously applied electrical signal.

18. An apparatus according to claim 14, wherein said modulated light generating means comprises laser beam generating means for generating a predetermined intensity of laser beam and light modulating means for modulating said laser beam in accordance with the modulating signal applied thereto.

19. An apparatus according to claim 14, wherein said modulated light generating means comprises a semiconductor laser beam generating means for emitting a laser beam having an intensity corresponding to the modulating signal applied thereto.

20. An apparatus according to claim 14, wherein said secondary light comprises the light reflected from said material.

21. An apparatus according to claim 14, wherein said secondary light comprises the light transmitted through said material.

22. An apparatus according to claim 14, further comprising an image forming lens for causing the light emitted from said modulated light generating means to be focussed on material supported by said holder means.

23. An apparatus according to claim 14, further comprising mixer means for mixing an extraneously applied electrical signal and said modulating signal and for applying the mixed signals to said modulated light generating means.

24. An apparatus according to claim 23, wherein said mixer means comprises an OR gate to which said modulating signal and said extraneously applied electrical signal are applied as input and which produces an output to be applied to said modulated light generating means.

25. An apparatus for obtaining information-carrying light comprising:

modulated light generating means for emitting light having an intensity varying in accordance with a modulating signal applied thereto;

deflector means for deflecting the light emitted from said modulated light generating means;

light splitter means for splitting the light from said deflector means into a pluralty of light beams;

material holder means for supporting material to be illuminated by one of the plurality of split light beams;

photoelectric converter means for detecting secondary light from the material on said material holding means when the material is illuminated by said one light beam and for producing an electrical signal corresponding to the quantity of detected secondary light;

reference signal generating means for generating a reference signal with which the electrical signal produced by said photoelectric converter means is compared;

comparator means for comparing said electrical signal with said reference signal to detect a difference therebetween and for applying a signal corresponding to said difference to said modulated light generating means as said modulating signal to maintain the quantity of light detected by said photoelectric converter means substantially constant; and means for varying said reference signal by an external electrical signal applied thereto.

26. An apparatus according to claim 25, further comprising:

a bias voltage source for generating a bias signal having a predetermined voltage; and switching means for selectively applying the electrical signal from said photoelectric converter means or the bias signal from said bias voltage source to said comparator means.

27. An apparatus according to claim 25, wherein said modulated light generating means comprises a laser beam generating means for generating a predetermined intensity of laser beam and light modulating means for modulating said laser beam in accordance with the modulating signal applied thereto.

28. An apparatus according to claim 25, wherein said modulated light generating means comprises a semiconductor laser beam generating means for emitting a laser beam having an intensity corresponding to the modulating signal applied thereto.

* * * * *

UNITED STATES PATENT OFFICE
CERTIFICATE OF CORRECTION

Patent No. 4,087,838      Dated May 2, 1978

Inventor(s) KATSUMI MASAKI ET AL

It is certified that error appears in the above-identified patent and that said Letters Patent are hereby corrected as shown below:

Column 3, line 13, delete "/2" and insert --of--;

Column 9, line 35, insert --$\therefore$-- before "$w_2 = w_1$";

Column 9, line 55, "$f \quad \frac{V}{0.03}$ Hz" should read --$f \gtrsim \frac{V}{0.03}$ Hz--;

Column 9, line 65, "$f \quad \frac{V}{P}$" should read --$f \gtrsim \frac{V}{P}$--;

Column 14, line 45, "canned" should read --scanned--.

Signed and Sealed this

Tenth Day of October 1978

[SEAL]

Attest:

RUTH C. MASON
*Attesting Officer*

DONALD W. BANNER
*Commissioner of Patents and Trademarks*